US012577379B2

(12) United States Patent
Miyoshi

(10) Patent No.: US 12,577,379 B2
(45) Date of Patent: Mar. 17, 2026

(54) NBR COMPOSITION AND BUFFER MATERIAL USING THE SAME

(71) Applicant: NOK CORPORATION, Tokyo (JP)

(72) Inventor: Yuji Miyoshi, Tottori (JP)

(73) Assignee: NOK CORPORATION, Tokyo (JP)

( * ) Notice: Subject to any disclaimer, the term of this patent is extended or adjusted under 35 U.S.C. 154(b) by 814 days.

(21) Appl. No.: 17/915,186

(22) PCT Filed: Mar. 3, 2021

(86) PCT No.: PCT/JP2021/008196
§ 371 (c)(1),
(2) Date: Sep. 28, 2022

(87) PCT Pub. No.: WO2021/199868
PCT Pub. Date: Oct. 7, 2021

(65) Prior Publication Data
US 2023/0121213 A1 Apr. 20, 2023

(30) Foreign Application Priority Data
Mar. 31, 2020 (JP) .................................. 2020-063585

(51) Int. Cl.
*C08L 9/02* (2006.01)
*C08K 3/04* (2006.01)
*C08K 5/40* (2006.01)
*C08K 5/47* (2006.01)

(52) U.S. Cl.
CPC *C08L 9/02* (2013.01); *C08K 3/04* (2013.01); *C08K 5/40* (2013.01); *C08K 5/47* (2013.01); *C08K 2201/005* (2013.01); *C08L 2205/06* (2013.01)

(58) Field of Classification Search
CPC .... C08L 9/02; C08K 3/04; C08K 5/40; C08K 5/47
See application file for complete search history.

(56) References Cited

U.S. PATENT DOCUMENTS

| | | | |
|---|---|---|---|
| 6,949,606 B1 | 9/2005 | Nishimura et al. | |
| 2009/0062444 A1* | 3/2009 | Moritani | C08K 5/14 |
| | | | 524/284 |
| 2012/0130010 A1* | 5/2012 | Azechi | C08K 3/04 |
| | | | 524/575.5 |
| 2015/0368448 A1 | 12/2015 | Kawai et al. | |

FOREIGN PATENT DOCUMENTS

| | | | |
|---|---|---|---|
| EP | 1 170 331 A1 | 1/2002 | |
| JP | 63-178148 A | 7/1988 | |
| JP | 2000320195 A * | 11/2000 | B60J 5/04 |
| JP | 2007-291295 A | 11/2007 | |
| JP | 2014-159506 A | 9/2014 | |
| JP | 6045935 B | 12/2016 | |

OTHER PUBLICATIONS

Bera et al. Structural/Load-Bearing Characteristics of Polymer-Carbon Composites Research Gate, Oct. 2018, p. 457-470 (Year: 2018).*
English Translation of JP-2000320195-A (Year: 2000).*
ISR issued in International Patent Application No. PCT/JP2021/008196, May 18, 2021, translation.
IPRP issued in International Patent Application No. PCT/JP2021/008196, Sep. 29, 2022, translation.

* cited by examiner

*Primary Examiner* — Catherine S Branch
*Assistant Examiner* — Olga Lucia Donahue
(74) *Attorney, Agent, or Firm* — GREENBLUM & BERNSTEIN, P.L.C.

(57) ABSTRACT

An NBR composition, that is excellent in rubber material processability and vulcanized rubber hardness, comprising 93 to 105 parts by weight of carbon black with a carbon black grade of N330 or N550, 1.0 to 4.0 parts by weight of a vulcanization retarder, 2.0 to 5.0 parts by weight of thiazole-based and thiuram-based vulcanization accelerators, and 1.0 to 4.0 parts by weight of a sulfur-based vulcanizing agent, based on 100 parts by weight of NBR. The vulcanized molded product obtained from the NBR composition has a rubber hardness (Duro A, instant) of 85 or more according to JIS K6253 corresponding to ISO 18517, and can be effectively used as an automobile buffer material such as a stopper for electric power steering, a buffer material for nailers, a buffer material for devices equipped with hydraulic cylinders, or the like.

9 Claims, No Drawings

NBR COMPOSITION AND BUFFER MATERIAL USING THE SAME

TECHNICAL FIELD

The present invention relates to an NBR composition and a buffer material using the same. More particularly, the present invention relates to an NBR composition that is excellent in rubber material processability and vulcanized rubber hardness, and a buffer material using the same.

BACKGROUND ART

Buffer members made of rubber are incorporated into various devices and tools as members that absorb the repeated impact of operating members. In particular, buffer stoppers used in steering parts of automobiles are required to have high hardness and high durability buffer performance as rubber performance because the impact load is large.

In order to improve the impact resistance of rubber buffer materials, it is possible to increase the size and weight of the buffer materials; however, these approaches are contradictory to the reduction of space and weight in the recent development of automobiles, and it is difficult to adopt such approaches.

In addition, metal or resin materials can be used to increase the hardness. However, although these approaches are effective against high impact for a few times, their longevity against repeated impact is considered to be limited in terms of flexibility.

For the above reasons, for example, high hardness rubber materials are adopted. However, in general, as the hardness of rubber materials increases, problems are likely to occur in the processes necessary for manufacturing such as processability and formability. Therefore, if the processability is improved, the product characteristics may not be satisfied, and it is difficult to balance between the two.

Rack parallel type (RP)-electric power steering (EPS) has the following merits:

by mounting the motor parallel to the rack axis, the unit mountability is improved;

by belt drive, it is possible to reduce friction loss and to deal with high torque at the same time; and because of low noise, the rack can be rigidly fixed by a subframe.

However, it has demerits such as impact input (stationary steering, curb collision, etc.) causes tooth skipping in the belt drive unit, resulting in deviation in steering position control.

For these reasons, items with a buffer function are required.

Patent Document 1 discloses a crosslinkable rubber composition for a buffer material, comprising:

(A) 100 parts by weight of a rubber component containing NBR;

(B) a crosslinking accelerator containing 1.0 to 2.5 parts by weight of di-2-benzothiazyldisulfide, 1.0 to 2.5 parts by weight of N-cyclohexyl-2-benzothiazylsulfenamide, and 1.0 to 4.5 parts by weight of tetraalkylthiuram disulfide; and (C) 0.3 to 1.0 parts by weight of a vulcanization retarder.

It is described that if the crosslinkable rubber composition for a buffer material does not contain even one of the three vulcanization accelerator components, extremely high impact resistance cannot be obtained, and that a filler such as carbon black can be contained. However, only furnace black is actually used.

PRIOR ART DOCUMENTS

Patent Documents

Patent Document 1: JP-B-6045935

OUTLINE OF THE INVENTION

Problem to be Solved by the Invention

An object of the present invention is to provide an NBR composition that is excellent in rubber material processability and vulcanized rubber hardness, and a buffer material using the same.

Means for Solving the Problem

The first object of the present invention can be achieved by an NBR composition comprising 93 to 105 parts by weight of carbon black with a carbon black grade of N330 or N550, 1.0 to 4.0 parts by weight of a vulcanization retarder, 2.0 to 5.0 parts by weight of thiazole-based and thiuram-based vulcanization accelerators, and 1.0 to 4.0 parts by weight of a sulfur-based vulcanizing agent, based on 100 parts by weight of NBR.

The second object of the present invention is achieved by a buffer material, which is a vulcanized molded product of the above NBR.

Effect of the Invention

The NBR composition according to the present invention and the buffer material using the same are excellent in rubber material processability and vulcanized rubber hardness, and makes it possible for both properties to coexist.

This is due to the effect of limiting the grade of carbon black used as a component of the composition to N330 or N550, and also indicates that the intended objects can be achieved even in the absence of N-cyclohexyl-2-benzothiazylsulfenamide, which is regarded as an essential component in Patent Document 1.

The present invention, which exhibits the above effects, provides high durability buffer stoppers and other vibration proof members excellent in processability and vulcanized rubber hardness.

Embodiments for Carrying Out the Invention

NBR used herein has a bound acrylonitrile (AN) content of 25 to 43 wt. %, preferably 27 to 40 wt. %, more preferably 27 to 35 wt. %, and a median of $ML_{1+4}$ (100° C.) of 20 to 60, preferably 30 to 50.

NBR may contain (meth)acrylic acid, (meth)acrylic acid lower alkyl ester, or the like by copolymerization.

Furthermore, NBR may be partially replaced and used, specifically replaced with 30 wt. % or less of sulfur vulcanizable synthetic rubber such as acrylic rubber or fluorine rubber.

As carbon black, N-330 or N-550 grade carbon black is used. N-330 grade carbon black has a particle size of 28 to 36 nm. In addition to N-330 (HAF carbon black), S-315, N-326, N-347, N-356, N-358, and the like can also be used.

N-550 grade carbon black has a particle size of 39 to 55 nm. In addition to N-550 (FEF carbon black), N-539, N-568, and the like are also used.

If the carbon black is changed to other than the above, for example, in the direction of N220 grade (direction of improving abrasion resistance) other than the above, the hardness of the rubber can be increased; however, the processability of the rubber is deteriorated. If the carbon black is changed in the direction of N990 grade (direction of improving processability), the opposite direction will be obtained.

N-330 or N-550 grade carbon black is used at a ratio of 93 to 105 parts by weight, preferably 95 to 100 parts by weight, based on 100 parts by weight of NBR. If the carbon black is used at a ratio less than the above range, the vulcanized rubber hardness and 100% tensile stress do not satisfy the required characteristics. In contrast, if the carbon black is used at a ratio greater than the above range, the vulcanized rubber hardness and 100% tensile stress show good values; however, the processability level does not satisfy the required characteristics.

As the vulcanization retarder, thioimide-based compounds, such as N-(cyclohexylthio)phthalimide, N-(2-ethylhexylthio)phthalimide, N-(cyclohexylthio)maleimide, and N-(4-t-butylphenylthio)succinimide are preferably used. In addition, aromatic monocarboxylic acids, aromatic dicarboxylic acids, or acid anhydrides thereof, amide compounds, and the like are also used.

Such a vulcanization retarder is used at a ratio of 1.0 to 4.0 parts by weight, preferably 1.0 to 2.5 parts by weight, based on 100 parts by weight of NBR. If the vulcanization retarder is used at a ratio less than the above range, the vulcanized rubber hardness shows a good value; however, the processability level does not satisfy the required characteristics. In contrast, if the vulcanization retarder is used at a ratio greater than the above range, vulcanization is excessively inhibited, so that significant impact resistance cannot be imparted and the vulcanization properties (rubber hardness) are reduced.

Examples of the vulcanization accelerator include thiazole-based vulcanization accelerators, such as di-2-benzothiazyldisulfide, N-cyclohexyl-2-benzothiazylsulfenamide, 2-mercaptobenzothiazole, zinc salt or cyclohexylamine salt of 2-mercaptobenzothiazole, 2-(N,N'-diethylthiocarbamoylthio)benzothiazole, and 2-(4'-morpholinodithio)benzothiazole; and thiuram-based vulcanization accelerators, such as tetramethylthiuram monosulfide, tetramethylthiuram disulfide, tetraethylthiuram disulfide, tetrabutylthiuram disulfide, tetrakis(2-ethylhexyl)thiuram disulfide, and dipentamethylenethiuram tetrasulfide. Preferably di-2-benzothiazyldisulfide and tetraalkylthiuram monosulfide are used.

The thiazole-based vulcanization accelerator is used at a ratio of 0.3 to 1.5 parts by weight, preferably 0.5 to 1.0 parts by weight, based on 100 parts by weight of NBR. Further, the thiuram-based vulcanization accelerator is used at a ratio of 1.5 to 4.0 parts by weight, preferably 2.0 to 3.0 parts by weight, based on 100 parts by weight of NBR. Both vulcanization accelerators are used in a total amount of 2.0 to 5.0 parts by weight, preferably 2.5 to 4.0 parts by weight.

If the total amount of the both vulcanization accelerators is less than the above range, vulcanization does not proceed sufficiently. In contrast, if the both vulcanization accelerators are used at a ratio greater than the above range, the hardness of the rubber can be increased; however, the processability and formability of the rubber are deteriorated. N-cyclohexyl-2-benzothiazylsulfenamide can be used as one component of the thiazole-based vulcanization accelerator, but is not an essential component.

As the sulfur-based vulcanizing agent, powdered sulfur, sulfur flower, precipitated sulfur, colloidal sulfur, surface treated sulfur, insoluble sulfur, polymer polysulfide, or the like is used at a ratio of 1.0 to 4.0 parts by weight based on 100 parts by weight of NBR.

In addition to the above essential components, an acid acceptor (e.g., an oxide or hydroxide of a divalent metal, or hydrotalcite), a plasticizer, an antioxidant, and other necessary compounding agents are added, and using a closed kneading machine, such as a kneader, and an open kneading machine, such as an open roll, a composition is prepared.

The obtained NBR composition has the minimum Mooney viscosity of less than 90 according to JIS K6300-1 corresponding to ISO 289, and the scorch time T5 of 10 minutes or more.

The vulcanization of the NBR composition is performed at about 160 to 190° C. for about 3 to 12 minutes. Vulcanization molding into a buffer material is performed by any conventionally known molding method, such as an injection molding method, a compression molding method, or a transfer molding method.

The vulcanized molded product has a rubber hardness (Duro A, instant) of 85 or more according to JIS K6253 corresponding to ISO 18517, and can be effectively used as an automobile buffer material such as a stopper for electric power steering, a buffer material for nailers, a buffer material for devices equipped with hydraulic cylinders, or the like.

In particular, the stopper for electric power steering functions as a stopper when the steering wheel is fully turned, so that a large force is applied thereto. The buffer material of the present invention sufficiently works as an automobile buffer material.

EXAMPLES

The following describes the present invention with reference to Examples.

Example 1

| | |
|---|---|
| NBR (PERBUNAN 2845F, produced by Lanxess; bound AN content of 28 wt. %, median of ML1 + 4 (100° C.) of 45) | 100 parts by weight |
| Carbon black (N330; particle size of 28 to 36 nm, iodine absorption amount of 82 g/kg) | 95 parts by weight |
| Zinc oxide | 10 parts by weight |
| N-(cyclohexylthio)phthalimide vulcanization retarder (Retarder CTP, produced by Toray Fine Chemicals Co., Ltd.) | 2.50 parts by weight |
| Di(2-ethylhexyl)sebacate | 5 parts by weight |
| Polymer polysulfide vulcanizing agent (Vulcar, produced by Toyo Chemicals Co., Ltd.) | 2.50 parts by weight |
| Tetramethylthiuram monosulfide vulcanization accelerator | 2 parts by weight |

(Nocceler TS, Produced by Ouchi Shinko Chemical Industrial Co., Ltd.)

Di-2-benzothiazyldisulfide vulcanization accelerator (Nocceler DM, produced by Ouchi Shinko Chemical Industrial Co., Ltd.) 0.50 parts by weight Each of the above components was kneaded with a kneader and an open roll, followed by vulcanizing them at 180° C. for 8 minutes.

The obtained vulcanized molded product was measured for the following items.

Moldability (Required Processability Index)

Minimum Mooney viscosity (VM): Measured according to JIS K6300-1 corresponding to ISO 289, using a Mooney viscometer (AM-4, produced by Toyo Seiki Seisaku-sho, Ltd.) with a test temperature of 125° C. and an L type rotor.

The unit is M, and less than 90 is acceptable.

Scorch time (T5): Measured according to JIS K6300-1 corresponding to ISO 289, with the same tester under the same conditions as the VM measurement.

The unit is minute, and 10 minutes or more is acceptable.

Required Characteristic Index of Spring (Product Function)

Hardness (according to JIS K6253 corresponding to ISO 18517, Duro A, instant).

85 or more is acceptable.

100% tensile stress (according to JIS K 6251 corresponding to ISO 37).

10 MPa or more is acceptable.

Tensile strength (according to JIS K 6251 corresponding to ISO 37).

15 MPa or more is acceptable.

Example 2

In Example 1, the amount of the vulcanization retarder was changed to 1 part by weight, and that of the vulcanizing agent was changed to 1 part by weight, respectively.

Example 3

In Example 1, the carbon black grade was changed to N550 (particle size of 39 to 55 nm, iodine absorption amount of 43 g/kg).

Example 4

In Example 3, the amount of the vulcanization retarder was changed to 1 part by weight, and that of the vulcanizing agent was changed to 4 parts by weight, respectively.

Comparative Example 1

In Example 1, the carbon black grade was changed to N220 (particle size of 24 to 33 nm, iodine absorption amount of 121 mg/g).

Comparative Example 2

In Example 1, the carbon black grade was changed to N770 (particle size of 70 to 96 nm, iodine absorption amount of 22 mg/g).

Comparative Example 3

In Example 1, the carbon black grade was changed to N990 (particle size of 250 to 350 nm, iodine absorption amount of 19 mg/g).

Comparative Example 4

In Example 2, the amount of the vulcanization retarder was changed to 0.40 parts by weight.

6

Comparative Example 5

In Example 2, the amount of the vulcanizing agent was changed to 0.60 parts by weight.

Comparative Example 6

In Example 2, 90 parts by weight of N550 was used as the carbon black grade.

Comparative Example 7

In Example 2, 106 parts by weight of N550 was used as the carbon black grade.

The results obtained in the above Examples and Comparative Examples are shown in the following Table.

TABLE

| Example | VM (M) | T5 (min) | Hardness | 100% tensile stress (MPa) | Tensile strength (MPa) |
|---|---|---|---|---|---|
| Example 1 | 82.2 | 17.7 | 90 | 13.3 | 21.1 |
| Example 2 | 86.4 | 19.3 | 88 | 10.5 | 18.8 |
| Example 3 | 80.2 | 20.4 | 89 | 13.2 | 17.6 |
| Example 4 | 72.5 | 15.5 | 91 | 19.2 | 18.0 |
| Comparative Example 1 | 106.7 | 13.4 | 91 | 11.9 | 18.4 |
| Comparative Example 2 | 37.8 | 31.1 | 78 | 7.5 | 18.7 |
| Comparative Example 3 | 23.1 | 47.2 | 68 | 3.0 | 13.0 |
| Comparative Example 4 | 91.0 | 16.7 | 88 | 11.1 | 18.4 |
| Comparative Example 5 | 86.4 | 20.5 | 84 | 9.3 | 18.4 |
| Comparative Example 6 | 72.7 | 17.9 | 84 | 9.7 | 15.7 |
| Comparative Example 7 | 102.1 | 12.5 | 90 | 11.9 | 14.4 |

The above results demonstrate the followings:

(1) Example 1 showed favorable values for rubber material processability and vulcanized rubber hardness.

(2) In Example 2, when the amounts of the vulcanization retarder and vulcanizing agent in Example 1 were reduced, the vulcanized rubber hardness has decreased while the processability has improved in comparison with Example 1, but the required characteristics are satisfied.

(3) In Example 3, when the grade of carbon black in Example 1 was changed to N550, the vulcanized rubber hardness has decreased while the processability has improved in comparison with Example 1, but the required characteristics are satisfied.

(4) In Example 4, when the amount of the vulcanization retarder was reduced and that of the vulcanizing agent was increased in Example 3, the processability (T5 value) has decreased in comparison with Example 3, but satisfied the required characteristics.

(5) In Comparative Example 1, when the carbon black grade of Example 1 was changed to N220, the vulcanized rubber hardness showed a good value; however, the processability level (VM) did not satisfy the required characteristics.

(6) In Comparative Examples 2 and 3, when the carbon black grade of Example 1 was changed to N770 or N990, the processability levels (VM and T5 value) satisfied the required characteristics; however, the vulcanization rubber strength did not satisfy the required level.

(7) In Comparative Example 4, when the amount of the vulcanization retarder in Example 2 was reduced, the vulcanized rubber hardness showed a good value; however, the processability level (VM) did not satisfy the required characteristics.

(8) In Comparative Example 5, when the amount of the vulcanizing agent in Example 2 was reduced, the vulcanized rubber hardness and 100% tensile stress did not satisfy the required characteristics in comparison with Example 2.

(9) In Comparative Example 6, when the carbon black grade of Example 2 was changed to N550 and the compounding amount thereof was changed to 90 parts by weight, the vulcanized rubber hardness and 100% tensile stress did not satisfy the required characteristics in comparison with Example 2.

(10) In Comparative Example 7, when the amount of carbon black in Comparative Example 6 was increased, the vulcanized rubber hardness and 100% tensile stress showed good values; however, the processability level (VM) did not satisfy the required characteristics.

The invention claimed is:

1. A nitrile butadiene rubber composition comprising
93 to 105 parts by weight of carbon black with a carbon black grade of N330 or N550,
1.0 to 4.0 parts by weight of a vulcanization retarder,
2.0 to 5.0 parts by weight of vulcanization accelerators consisting of di-2-benzothiazyl disulfide and tetraalkylthiuram monosulfide, and
1.0 to 4.0 parts by weight of a sulfur-based vulcanizing agent,
based on 100 parts by weight of nitrile butadiene rubber.

2. The nitrile butadiene rubber composition according to claim 1, wherein the carbon black of N330 is carbon black having particle size of 28 to 36 nm.

3. The nitrile butadiene rubber composition according to claim 1, wherein the carbon black of N550 is carbon black having particle size of 39 to 55 nm.

4. The nitrile butadiene rubber composition according to claim 1, wherein the minimum Mooney viscosity is less than 90 according to JIS K6300-1 corresponding to ISO 289, and the scorch time is 10 minutes or more.

5. A vulcanized molded product of the nitrile butadiene rubber composition according to claim 1.

6. The vulcanized molded product according to claim 5, which is a buffer material.

7. The vulcanized molded product according to claim 6, which is a buffer stopper.

8. The vulcanized molded product according to claim 5, wherein the rubber hardness (Duro A, instant) according to JIS K6253 corresponding to ISO 18517 is 85 or more.

9. A nitrile butadiene rubber composition comprising
93 to 105 parts by weight of carbon black with a carbon black grade of N330 or N550,
1.0 to 4.0 parts by weight of a vulcanization retarder,
2.0 to 5.0 parts by weight of vulcanization accelerators, and
1.0 to 4.0 parts by weight of a sulfur-based vulcanizing agent,
based on 100 parts by weight of nitrile butadiene rubber;
wherein the entirety of the vulcanization accelerators in the nitrile butadiene rubber composition consists of di-2-benzothiazyl disulfide and tetraalkylthiuram monosulfide.

* * * * *